United States Patent

Diepstraten et al.

[11] Patent Number: 5,553,316
[45] Date of Patent: Sep. 3, 1996

[54] POWER CONTROL METHOD IN A WIRELESS COMMUNICATION SYSTEM

[75] Inventors: Wilhelmus J. M. Diepstraten, Diessen; Johannes P. N. Haagh, Eindhoven, both of Netherlands

[73] Assignee: NCR Corporation, Dayton, Ohio

[21] Appl. No.: 587,172

[22] Filed: Jan. 16, 1996

Related U.S. Application Data

[63] Continuation of Ser. No. 992,956, Dec. 18, 1992, abandoned.

[30] Foreign Application Priority Data

Jul. 3, 1992 [GB] United Kingdom .................. 9214107

[51] Int. Cl.[6] ...................................... H04B 7/26
[52] U.S. Cl. ............... 455/69; 455/63; 370/85.3
[58] Field of Search ................... 455/52.1, 52.2, 455/52.3, 68, 69, 67.1, 67.3, 67.4, 63; 379/85.1, 85.3, 94.1, 95.1, 95.2, 95.3

[56] References Cited

U.S. PATENT DOCUMENTS

| | | | |
|---|---|---|---|
| 4,639,914 | 1/1987 | Winters | 455/69 |
| 5,003,619 | 3/1991 | Morris et al. | 455/69 |
| 5,129,098 | 7/1992 | McGirr et al. | 455/67.1 |
| 5,204,970 | 4/1993 | Stengel et al. | 455/69 |
| 5,220,564 | 6/1993 | Tuch et al. | 370/94.1 |
| 5,241,690 | 8/1993 | Larsson et al. | 455/69 |
| 5,278,992 | 1/1994 | Su et al. | 455/69 |

*Primary Examiner*—Reinhard J. Eisenzopf
*Assistant Examiner*—Thanh Le
*Attorney, Agent, or Firm*—James M. Stover

[57] ABSTRACT

A wireless local area network (10) including a plurality of stations (12) utilizes dynamic transmit power level control such that only the power level needed for reliable transmission to a particular station (12) is utilized. Each transmitted information packet (80) contains a byte (92) representing the power level at which the packet (80) was transmitted. The power level at which the packet (80) is received is measured and a path attenuation value is calculated, averaged over a plurality of packets and utilized, together with a measured interference level also transmitted in the packet (80), to determined a transmit power level for that path. Also determined is an associated defer threshold level. The transmit power levels and associated defer threshold levels are stored in a table (270).

6 Claims, 10 Drawing Sheets

POWER CONTROL METHOD IN A WIRELESS COMMUNICATION SYSTEM

This is a continuation of application Ser. No. 07/992,956, filed on Dec. 18, 1992, now abandoned.

This invention relates to a method of operating a wireless local area network including a plurality of stations utilizing a common wireless communication channel.

BACKGROUND OF THE INVENTION

When transmitting digital information in a wireless local area network utilizing a common channel (frequency band), it is found that interference is produced in other nearby networks using the same frequency band. For example, before accessing the medium, a station may sense the medium to determine whether there is a carrier signal present higher than a predetermined level. If so, the station will defer its transmission until the medium is sensed to be available. The medium is then accessed according to a protocol such as a CSMA/CA (carrier sense multiple access with collision avoidance) protocol. It will be appreciated that the total system throughput is limited by the defer procedure.

U.S. Pat. No. 4,905,235 discloses a time division multiplex wireless transmission system in which a plurality of earth stations communicate with one another via a transponder in a satellite. Transmissions are controlled in accordance with a burst time plan transmitted to and stored in each station such that a predetermined total electrical power level is not exceeded at the transponder. This known system relates to a satellite communications and is complex and expensive, resulting from the need to transmit and store a burst time plan in all the earth stations in the system.

OBJECT OF THE INVENTION

It is an object of the present invention to provide a method of operating a wireless local area network utilizing a single wireless communication channel which enables system throughput to be increased.

SUMMARY OF THE INVENTION

Therefore, according to the present invention, there is provided a method of operating a wireless local area network including a plurality of stations utilizing a common wireless communication channel. The method comprises the step of dynamically adjusting the power level of information packets transmitted between any two stations, in dependence on the signal path between said stations.

It will be appreciated that using a method of operating a wireless local area network according to the invention, system throughput is increased since the power level used for transmissions between nearby stations may be reduced, thereby reducing the interference caused in other networks, and enabling reuse of the transmission medium to be improved.

One embodiment of the present invention will now be described, by way of example, with reference to the accompanying drawings.

DETAILED DESCRIPTION OF THE PREFERRED EMBODIMENT

Figure 1:
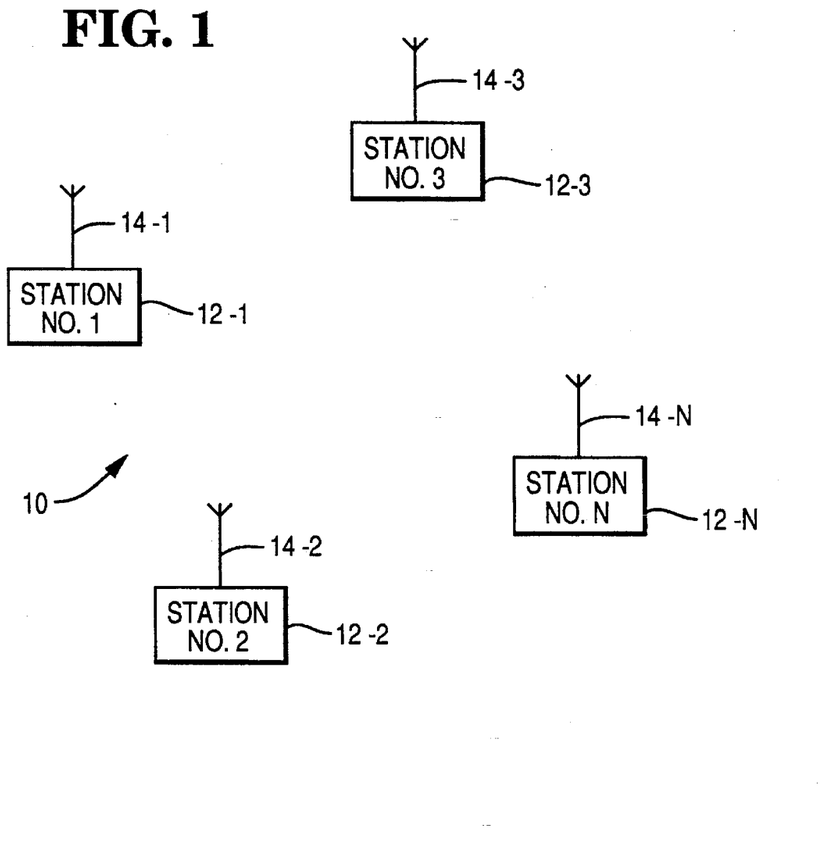
FIG. 1 is a diagram of a wireless local area network (LAN).

Referring first to FIG. 1, there is shown a wireless local area network (LAN) 10 including a plurality N of data processing stations 12, shown individually as stations 12-1 to 12-N. Each station 12 has an antenna 14, shown individually as antennas 14-1 to 14-N. The stations 12 communicate with one another over a common single wireless communication channel. It is assumed that each station is in the coverage area of all the other stations, that is, each station 12 can receive the transmissions from any other station 12.

Figure 2:
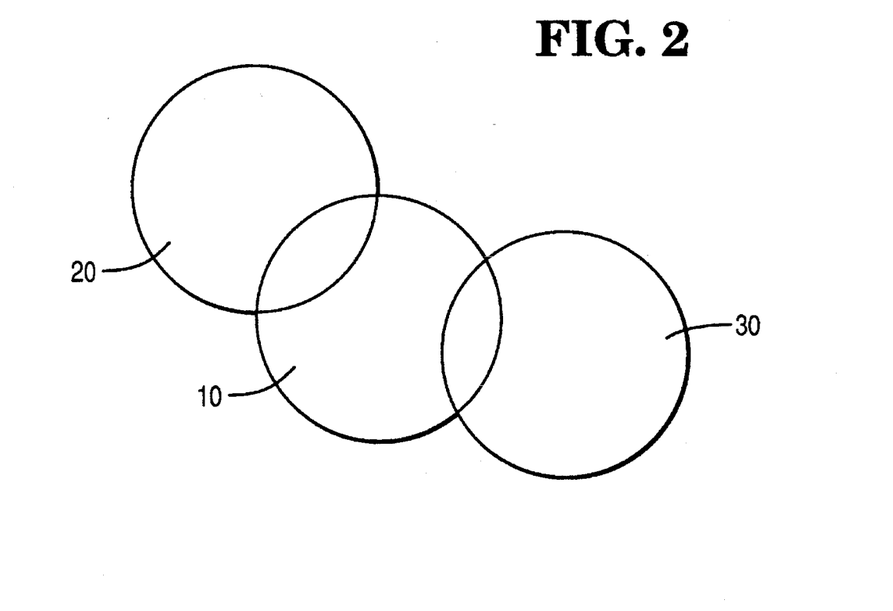
FIG. 2 illustrates a plurality of wireless LANs having overlapping coverage areas.

It should be understood that other networks using the same frequency band may have coverage areas which overlap the coverage area of the network 10. Referring to FIG. 2, it is seen that the network 10 has a coverage area which overlaps the coverage areas of two other similar networks 20 and 30.

Referring again to FIG. 1, the manner in which a station 12 acquires access to the wireless transmission channel will now be briefly described. Before accessing the medium, a station 12 desiring access to the medium will first sense the medium. If a carrier signal is detected having a level higher than a certain threshold, the station will defer its transmission until this condition is no longer present. Thereafter a CSMA/CA (carrier sense multiple access with collision avoidance) protocol is utilized, for example, the station backs off for a random waiting time before making a new transmission attempt. This arrangement renders the chance of a collision very unlikely.

Figure 3:
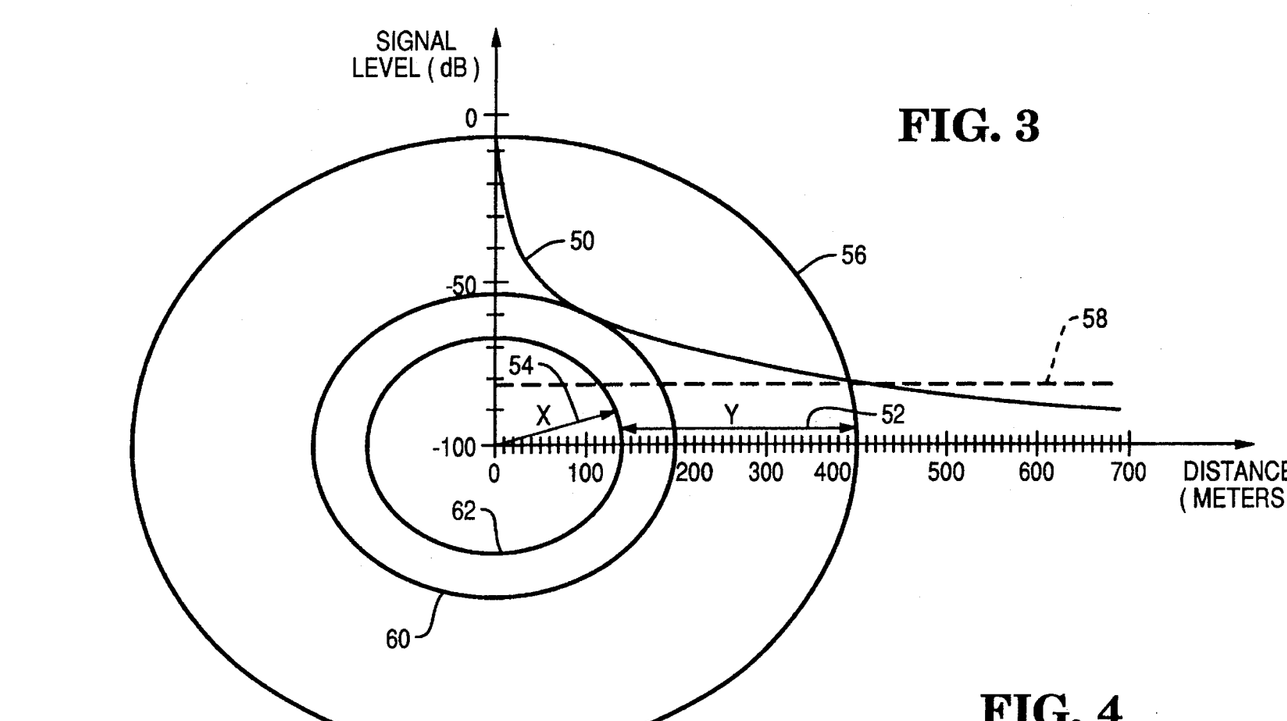
FIG. 3 is a graphical diagram illustrating signal levels and areas for a transmitting station.

Referring now to FIG. 3, there is shown a curve 50 which represents the average receive signal level (in decibels) for a transmitter located at the origin in relation to a receiver located at a distance indicated on the horizontal axis. It will be appreciated that the receive signal is a function of the transmit level used, the distance between the transmitter and the receiver and the attenuation coefficient of the environment. In order to allow substantially error-free reception, the desired signal level should be substantially greater than any interference signal derived from the transmitters in other networks. The actual difference will depend on the modulation method used and the quality of the receiver design. Assume that the difference should be at least a value SIR (Signal to Interference Ratio). This implies that transmitters in another network within a certain range Y, indicated by the arrow 52, should be prevented from accessing the medium. For a given carrier detect threshold, assume that the SIR condition can be met within a distance X, indicated by the arrow 54, from a transmitter at the origin. However, only one transmitter can generally be permitted to be active within a distance X+Y from the transmitter at the origin. Thus multiple networks within each other's coverage area, such as the networks 10, 20 and 30, FIG. 2, each using the same frequency band, have to share the transmission medium bandwidth.

As mentioned, the curve 50 represents the average receive level as a function of the distance of a receiver from a transmitter located at the origin. The actual receive level will in practice be influenced by factors such as shadowing and fading. These effects are well know to those skilled in the art. Shadowing is a deviation from the expected average receive level resulting from antenna placement, obstructions, or wave guiding conditions between transmitter and receive. Fading is a fluctuation of the receive level from the average, resulting from small movements of the antenna, or from multiple signal bounces aiming at the receiver with slightly different phases, so that some signals add while others tend to cancel out.

Another factor which influences the success of a transmission in the wireless network 10 is a background interference level (also referred to as the silence level), which results from radio sources other than transmitters in the wireless LANs such as the networks 10, 20 and 30, operating at, or having frequency components in, the same band as that used by the LANs. Such sources are generally continuous, such as a base station transmitter for a paging system. The wireless LAN stations 12 do not generally defer to such background interference signals since they use different modulation schemes. However, a certain difference between the wanted signal and such background interference is necessary for reliable reception.

An important feature of the present invention is that the transmit level of transmission of information packets from a transmitter is varied in dependence on the destination of the packet. Thus, transmissions to relatively close destinations can use much less power than transmissions to relatively remote destinations to achieve an acceptable SIR condition at the receiver station. Hence, transmitters in other networks can utilize the medium at the same time since they do not need to defer to the weaker signal. Thus, reuse of the frequency band is achieved.

When a transmitter desires to transmit to a nearby station at a reduced power level, it is advantageous that its defer threshold level should be increased to take advantage of the fact that the distance of given powered transmitter for which the station desiring to transmit will defer, can be reduced. Otherwise, for example the station at the origin in FIG. 3 would still unnecessarily defer for any stations within the 400 meter boundary shown by the largest circle 56 in FIG. 3.

As an aid to understanding the subject invention an overview of the manner in which the transmission power and defer threshold are adjusted will first be discussed in general terms. Then, a detailed implementation and operational mode will be described.

Each addressed receiver will measure the signal level of the received signal coming from a specific source. As a default condition, at startup, each transmitter transmits at full power. However, since the transmit power may change, the receiver is informed of the actual transmit power level by including a separate byte in the transmitted frame structure. Another provided byte represents the aforementioned silence level (interference level) at the transmitter, since this value is also relevant in determining the transmit power level required.

Figure 4:
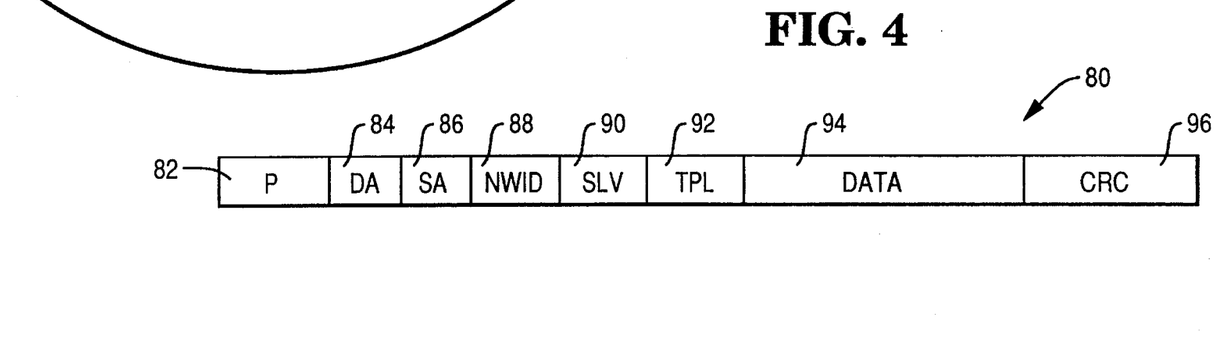
FIG. 4 is a diagram of a transmitted information packet.

Referring briefly to FIG. 4, there is shown the structure of a transmitted packet 80. The packet 80 starts with a preamble 82, which is followed by a destination address (DA), 84, a source address (SA), 86, and a network identification byte (NWID), 88, identifying the relevant network 10, 20 or 30. Next there follows a silence level (SLV) byte 90, representing the silence (background interference) level at the transmitter, and a transmit power level (TPL) byte 92, representing the transmit power level at the transmitter. Next follow a data portion 94, and a CRC check portion 96. With this formation for a transmitted message packet, the receiver is informed of the transmit power level (TPL) and the silence (interference) level (SLV) at the transmitter.

Continuing with the overview, by subtracting the measured receiver signal level from the transmit power level, the receiver can calculate the instantaneous signal path attenuation. By averaging this value over a plurality of received packets, an average signal path attenuation can be calculated. This value is then utilized in an algorithm which determines a transmit level and a defer threshold value, which are stored in a table to be utilized when the receiver station desires to transmit a packet to the transmitter station, i.e. when the transmit and receive functions are interchanged for the two stations in question. It should be understood that the silence level byte (SLV) is utilized to ensure that the expected receive level is at least SIR dB higher than the silence (interference) level. If not, then the calculated transmit level is increased accordingly. The table is addressed in accordance with the destination address (DA) of a packet to be transmitted, to provide the relevant transmit power level and defer threshold level for that destination.

Referring again to FIG. 3, as previously mentioned, the curve 50 represents the receive signal level as a function of distance from a transmitter located at the origin. It should be understood that the numerical values indicated in FIG. 3 are by way of example only. For instance, it is assumed that the transmit output level measured at 1 meter from the source is −6 dBm (as is conventional, the symbol m represents an absolute value rather than a ratio). The attenuation curve 50 is typical for an indoor office environment. For case of explanation, it is assumed that the environment is substantially homogeneous, not separated by attenuation boundaries such as walls or ceilings. The outer circle 56 represents the boundary at which the average attenuation of the transmitted signal is such that its level is equal to the carrier detect level of the receiver (−82 dBm, as shown by the dotted line 58), for a transmitter at the origin and a receiver on the boundary of the circle 56. Since the stations 12 use a CSMA type access protocol, the circle 56 is also the average boundary at which stations will defer for other transmitters in this area. In other words all transmitters (operating at full power) will share the same bandwidth within the outer circle 56. The middle circle 60 represents the average boundary at which packets can be reliably received, assuming a certain background noise level (for instance 18 dB above thermal noise). However, in order to achieve substantially reliable reception, i.e., a certain low bit error rate, the interference level from other networks should be an amount SIR dB lower than the wanted signal. As mentioned, the SIR value depends on the modulation method and quality of the receiver implementation.

Assume now that a transmitter is active just outside the outer circle 56, it being appreciated that a transmitter at the origin will not defer for such activity. Then all receivers within an inner circle 62 will receive the wanted signal at least SIR dB higher than the disturbing signal. Thus, it will be appreciated that the inner circle 62 represents a "safe coverage area", that is, an interference limited coverage area for reliable reception from a transmitter at the origin.

Assume now that the destination station is located at half the safe coverage distance of the circle 62 from the origin. Then, in accordance with the present invention, the transmit level is reduced to such a value as to provide a SIR difference between the wanted signal and an interference signal, then the interference generated in other networks by the transmitter located at the origin will be lower and consequently a transmitter much closer to the origin could be allowed to transmit. As previously mentioned, it is desirable that the defer threshold of a station which is to transmit at a reduced power level should be increased since otherwise the station would unnecessarily defer to all transmitters closer to the origin than the outer circle 56.

It can be calculated that where dynamic power control in accordance with the present invention is utilized, an overall reuse factor of 3 for the transmission medium is achievable. Another major advantage is that small clustered networks will generate much less interference in neighboring, possibly larger, networks, whereby the total throughput of the network system will be significantly increased. In this situation, the reuse improvement may be much greater than a factor of 3, and could be in the range of 30 or more, for example.

It should be understood that the network starts with transmit power levels at default maximum transmit levels and will learn more optimum settings as communication proceeds. No interchange of information other than the silence and transmit power level bytes 90, 92 (FIG. 4) is needed.

Figure 5:
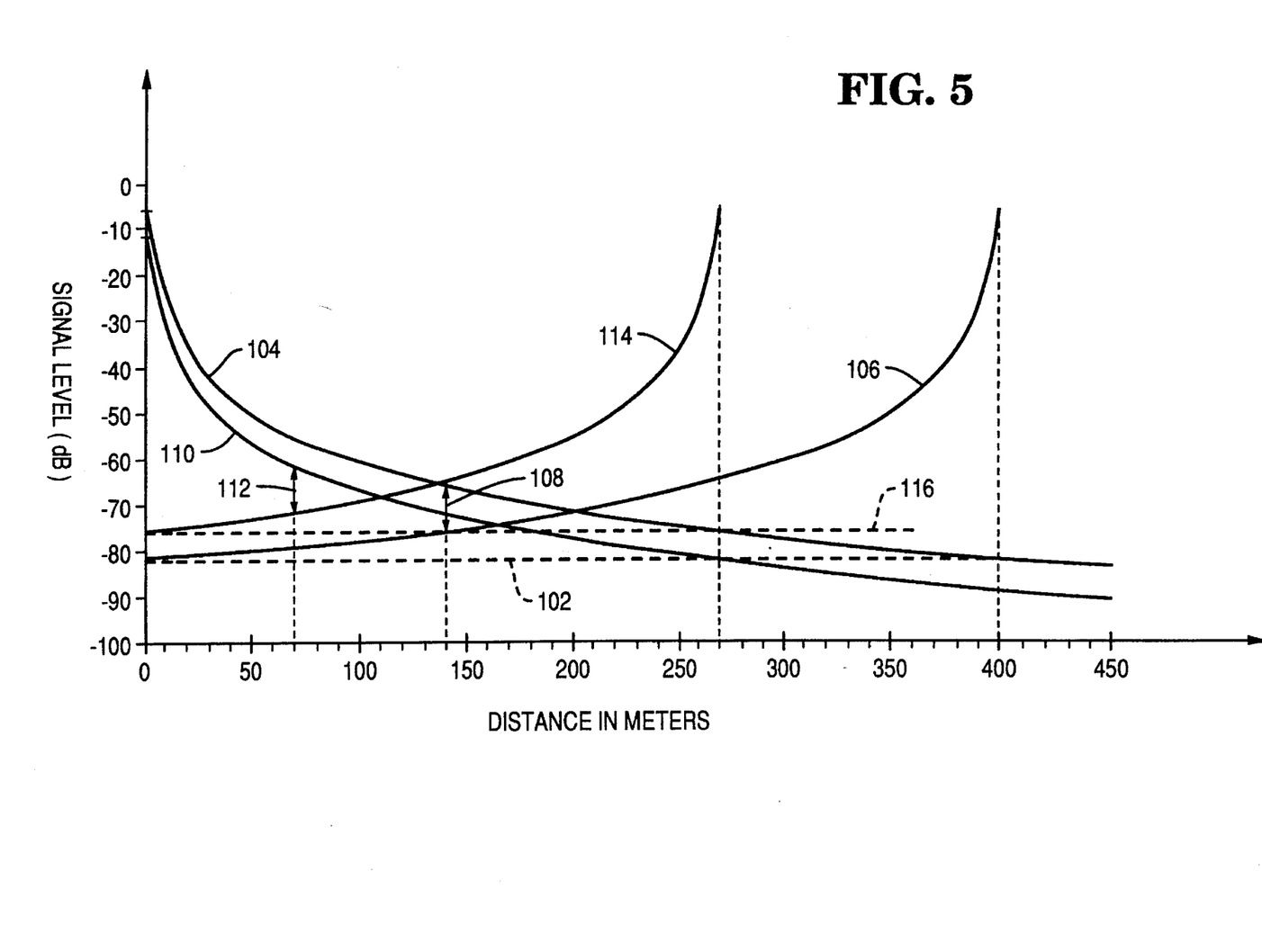
FIG. 5 is a graphical diagram showing different power level transmission from two transmitting stations.

Referring now to FIG. 5, the advantages achievable by the present invention will be further illustrated. FIG. 5 shows power level to distance curves for a typical office environment. If the defer threshold is −82 dBm, as shown by the dotted line 102 (corresponding to the line 58 in FIG. 3), then a transmitter at the origin will defer to all stations within a 400 meter range, since this level is reached by the curve 104 at such 400 meter distance. If a station is active at or just outside this distance, as shown by the curve 106, then all stations within a 140 meter radium from the transmitter will meet the above-discussed SIR criterion, that is, the curves 104 and 106 are separated by a distance corresponding to the value of SIR, as shown by the arrow 108, at the distance of 140 meters from the origin.

Assume now that an intended receiver is located at 70 meters from the transmitter at the origin. Then this location can be reached by a 6 dB lower transmit level, in accordance with the curve 110, with sufficient SIR separation, indicated by the arrow 112 being achieved for full-power level transmitter located as close as 270 meters, in accordance with the curve 114. Furthermore, the defer threshold can be increased by 6 dB to −76 dBm as shown by the dotted line 116, such that the transmitter at the origin will defer to other full-power transmitters active within a 270 meter radius, rather than the original 400 meter radius.

Figures 6, 6C:
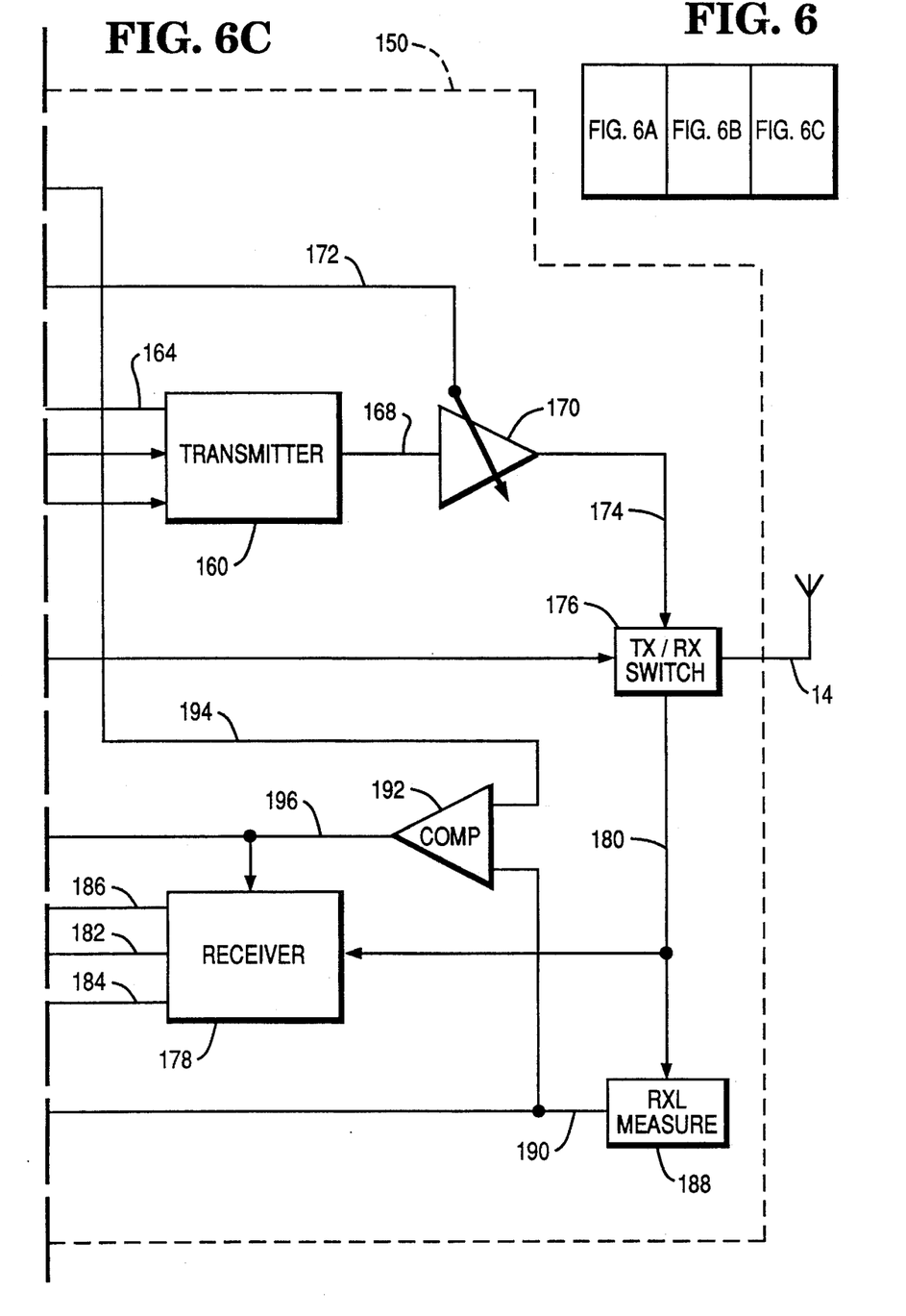
FIGS. 6A to 6C are a block diagram showing hardware and software contained in a typical station for providing a dynamically adjustable transmit power level.
FIG. 6 is a diagram showing the interrelationship of FIGS. 6A, 6B, and 6C.
Figure 6A:
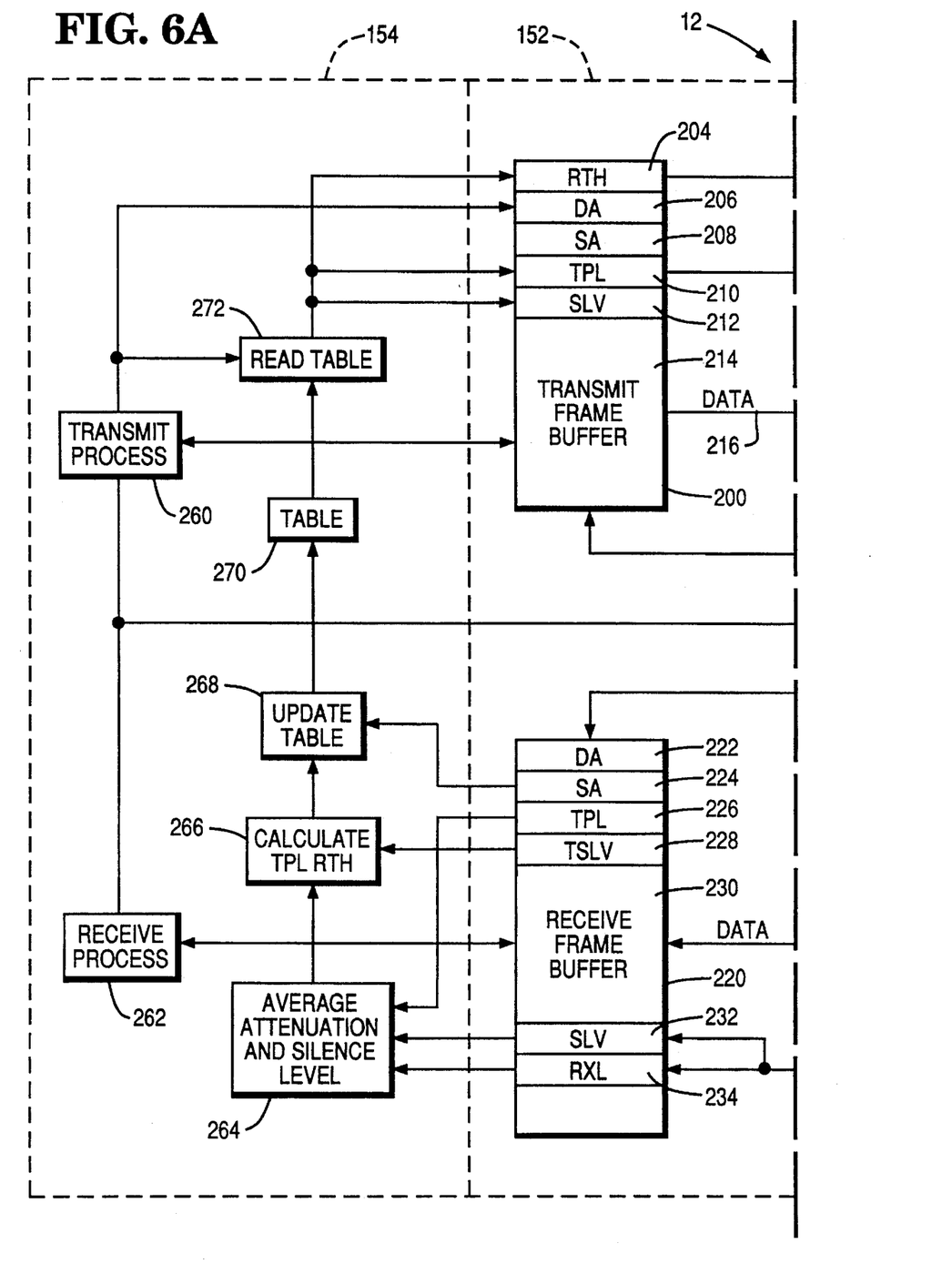
Figure 6B:
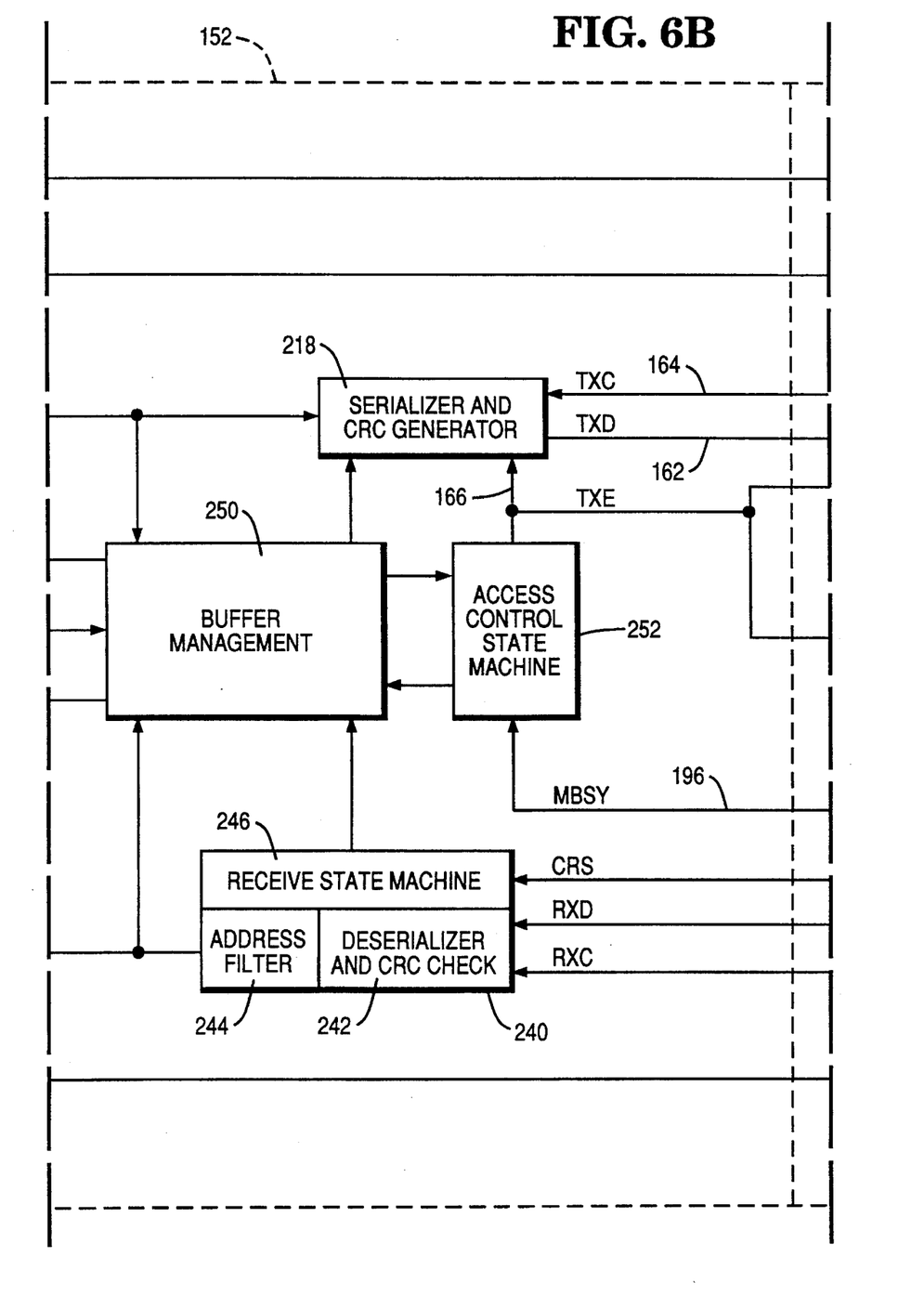

Referring now to FIG. 6A to 6C, there is shown a block diagram of a station 12. The station 12 is shown as including a modem section 150, a control section 152 and driver software 154. The modem section 150 includes an RF transmitter 160 adapted to receive data bits TXD to be transmitted over a line 162, in accordance with clock signals TXC provided on a line 164. Transmission in initiated in accordance with a TXE control signal provided on a line 166. The output of the transmitter 160 is provided on a line 168 to a variable power control circuit 170, which is controlled in accordance with a transmit power level control signal on a line 172, and which provides a controlled level output signal on a line 174. The line 174 is connected to a transmit/receive (TX/RX) switch 176 which switches the antenna 14 to either the transmitter 160 or to a receiver 178 in accordance with the TXE control signal on the line 166. The default state of the switch 176 is receive mode.

The receiver 178 receives an input from a line 180 connected to an output of the TX/RX switch 176. The receiver 178 processes the signal received on the line 180 to provide receive data (RXD) signals on a line 182 and a receive clock (RXC) signal on a line 184. In addition, the receiver provides a carrier sense (CRS) signal on a line 186, which indicates when received data is available on the RXD line 182.

Also included in the modem section 150 is a receive level (RXL) measurement circuit 188, which continuously measures the receive signal level in the RF band of interest. When no carrier activity is present on the transmission medium, the silence (interference) level is measured, whereas during receipt of a packet, that is, during an active carrier signal, the power level of the packet being received is measured. The output of the receive level measurement circuit 188 is connected via a line 190 to the input of a comparator 192, which compares the measured receive level with a threshold value provided on a line 194, and provides a medium busy (MBSY) signal on an output line 196 when the measured signal level is above the applied threshold level value.

The control section 152 includes as transmit frame buffer 200 which serves as an interface between the host system (not shown) and the modem 150. The transmit frame buffer 200 includes sections 204 through 214, storing, respectively, in respect of a packet to be transmitted, the relevant defer level (receive level threshold) RTH, the destination address DA, the source address SA, the transmit power level TPL at which the packet is to be transmitted, the silence level SLV determined at the source station, and the data to be transmitted. Data is provided from the transmit frame buffer 200, sending the contents of the sections 206–214 over a line 216 to a serializer and CRC generator circuit 218 which serializes the data when the signal TXE is applied over the line 166, and calculates the CRC check portion and appends it to the packet.

Also included in the control section 152 is a receive frame buffer 220 which contains sections 222 through 230 storing, respectively, the received destination address (DA), source address (SA), transmit power level (TPL), transmitter silence level (TSLV), and data. In addition, the receive frame buffer 220 includes sections 232 and 234 which store the locally measured silence level and packet receive level, provided by the measurement circuit 188. The silence level is measured a predetermined time after the received packet when, in accordance with the protocol being utilized, the medium should contain no signal. The control section 152 also contains a receive control circuit 240 which includes a deserializer 242, an address filter 244 and a receive state machine 246. If the address filter 244 determines that the received packet destination address (DA) matches the station address, the recovered packet is deserialized by the deserializer 242, and checked for correct reception using the CRC check portion. The receive state machine 246 causes the measured silence level and packet signal level to be loaded into the receiver frame buffer sections 232 and 234, respectively.

A buffer management circuit 250 is effective to control the transfer of data to and from the frame buffers 200, 220 and also serves as a control/status interface between the host system (not shown) and the circuits in the control section 152. An access control state machine 252 serves to control the medium access protocol, which is a "listen before talk" CSMA/CA protocol which senses the medium busy (MBSY) signal on the line 196. When a packet is ready to be transmitted, the state machine 252 causes the relevant values of the receive threshold (RTH) and transmit power level (TPL) to be applied from the transmit frame buffer sections 204 and 210 to the modem section 150. After a time period sufficient to allow for possible generation of the MBSY signal on the line 196, the line 196 is sensed and if inactive, the TXE line 166 is activated to initiate packet transmission.

The functional blocks contained in the driver software 154, which controls the host system (not shown) will now be briefly described. The transmit and receive functions are controlled generally by a transmit process function 260 and a receive process function 262. A functional block 264 subtracts the measured receive level (RXL) from the transmit power level and effects an averaging function. The block 264 also effects an averaging function on the measured silence level (SLV). A functional block 266 is effective to perform the dynamic adjustment process, and utilizes an algorithm or table to convert the average measured attenuation into a transmit power level (TPL) and receive (defer) threshold level (RTH) for that path. The received silence level (TSLV) from the source station is utilized to adjust the transmit power level (TPL) to ensure that a sufficiently high transmit power level is generated such that a subsequent transmission to that source station (now, of course, acting as the destination station) uses adequate power where that station has a high interference (silence level).

The output of the functional block 266 is applied to a functional block 268 which updates the calculated values for the particular source address from which a packet originated in a table 270 referenced by the source address. A read table functional block 272 is operative during the transmit process to read the receive threshold (defer) level RTH and transmit power level TPL from the table 270, referenced by the destination address (DA) of a packet to be transmitted and load these values into the transmit frame buffer 200. The read table functional block 272 also effects the loading of the averaged silence level of the transmitting station into the transmit frame buffer section 212.

Figure 7:
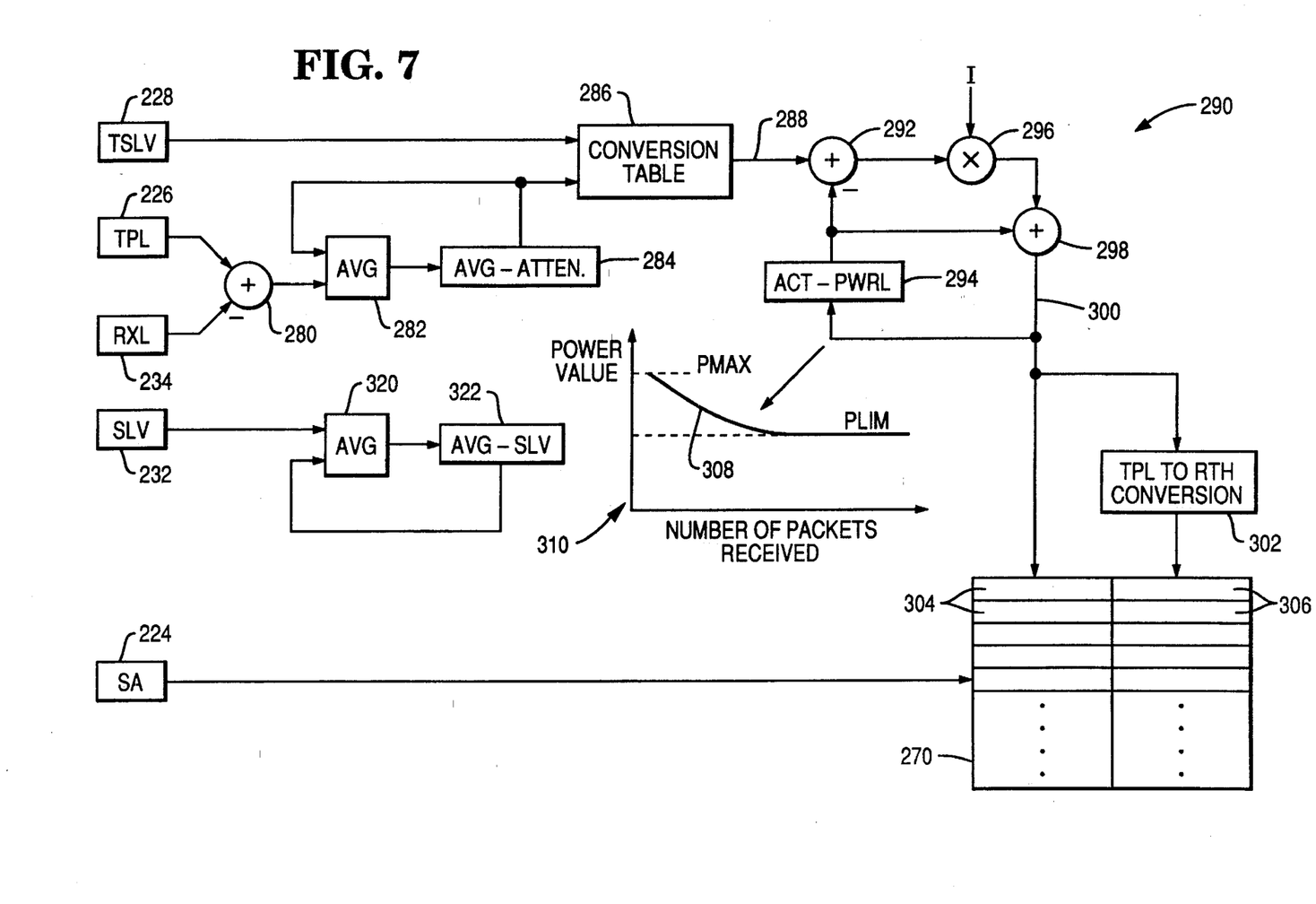
FIG. 7 is block diagram illustrating level calculations and an averaging procedure.

Referring now to FIG. 7, there is shown a block diagram of the level calculation and learning algorithm. The measured receive level (RXL) of a packet is subtracted in an adder 280 from the transmit power level (TPL) contained in the received packet to provide a value dependent on the attenuation for that packet. The output of the adder 280 is applied to an averaging circuit 282 which effects an averaging function and provides an average attenuation value to a register 284. It should be understood that the value of the time constant used in the averaging circuit may be controlled in dependence on the network station, for example, for mobile stations it is desirable to use a small time constant to allow for fast adaptation to the attenuation situation. It will be appreciated that although only one register 284 is shown in FIG. 7, there could in practice be a plurality of such registers, associated respectively with the other stations 12 in the network and addressable in the manner of a table. The value from the relevant register 284 is applied to a conversion table 286 which also receives the source silence level (SLV-S) provided in the received packet and provides a wanted power value on a line 288. This wanted power value may vary in accordance with variations in the associated averaged attenuation value. The wanted power value on the line 288 is applied to an integrating circuit 290. The integrating circuit 290 includes an adder 292 to which the line 288 is connected, and which receives a subtractive input from a register 294 which contains the actual power level (ACT-PWRL). The output of the adder 292 is applied to a multiplier 296, to which is also applied a constant value I, which is selected in accordance with the desired adaptation rate to be achieved by the integrating circuit 290. The output of the multiplier 296 is applied to an adder 298 which receives another input from the register 294. The output of the adder 298 provides the actual power level value (ACT-PWRL) on a line 300 connected to the register 294, the table 270, and a TPL to RTH conversion circuit 302 which provides a threshold (defer) level output in dependence on the input power level value. The RTH value increases as the TPL value decreases. The conversion circuit 302 is also connected to the table 270. The table 270 stores, at addressable locations corresponding to the station addresses of the stations 12 in the network 10, the calculated power level values in locations 304 and the calculated receive threshold (defer) values in locations 306. Thus, the table 270 is addressed by the source address of a received packet to store data therein, and is addressed by the destination address of a packet to be transmitted to read data therefrom.

In operation of the circuit of FIG. 7, it should be understood that all stations start with default maximum power levels for all the other stations 12 in the network 10, such levels being stored in the relevant locations 304 in the table 270. As the number of packets received from a given station increases the actual power level on the line 300, which is illustrated by the curve 308 in a graphical insert 310, decreases from the maximum power value PMAX towards an asymptotic limit value PLIM, which is a function of the AVG-ATTEN in the register 284 and the transmitted silence level value TSLV.

Also shown in FIG. 7 is an averaging circuit 320 which is effective to average the locally measured silence (interference) level value SLV, and store the averaged value in a register 322.

Figure 8A:
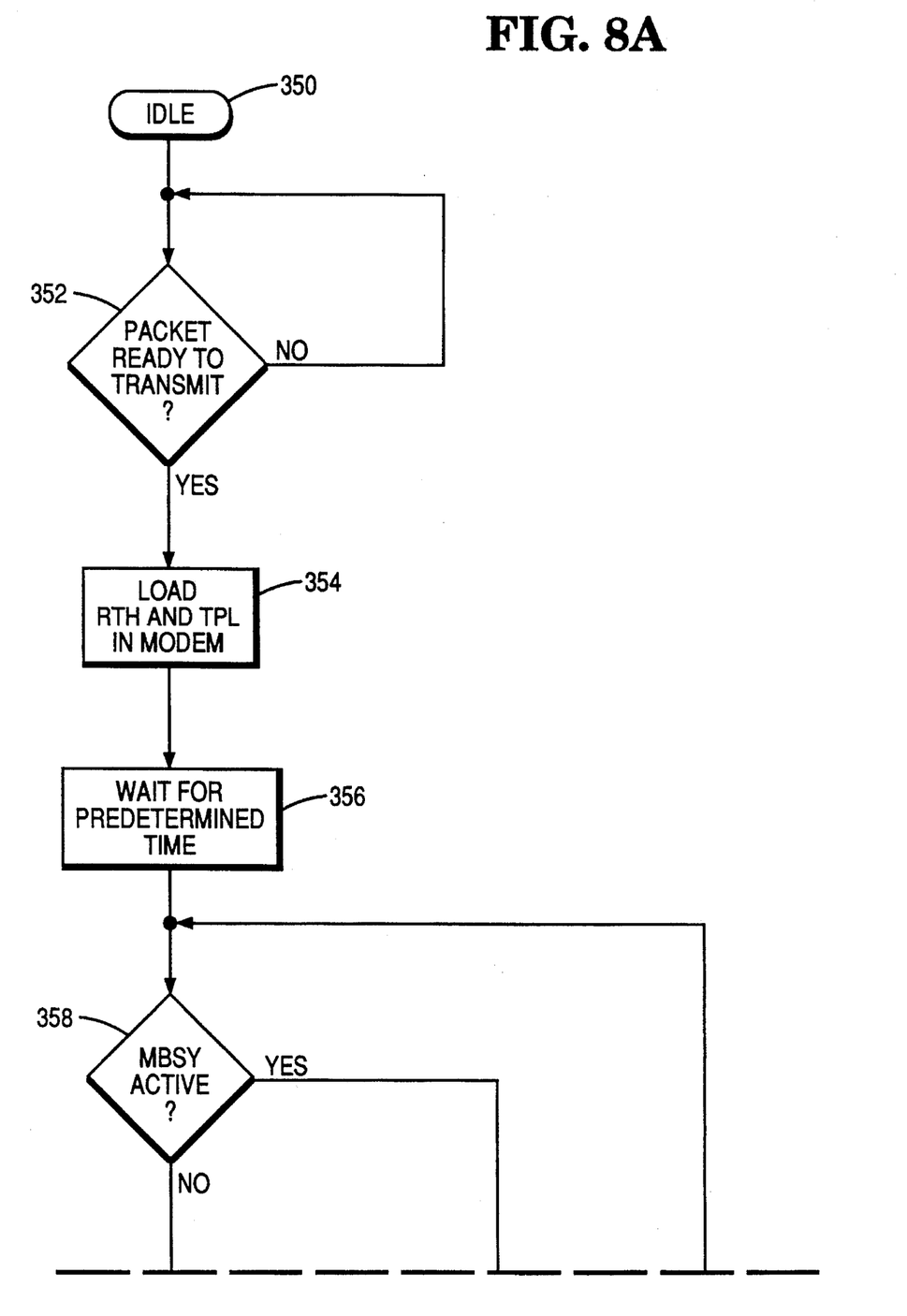
FIG. 8A and 8B are a flowchart for information packet transmission.
Figure 8B:
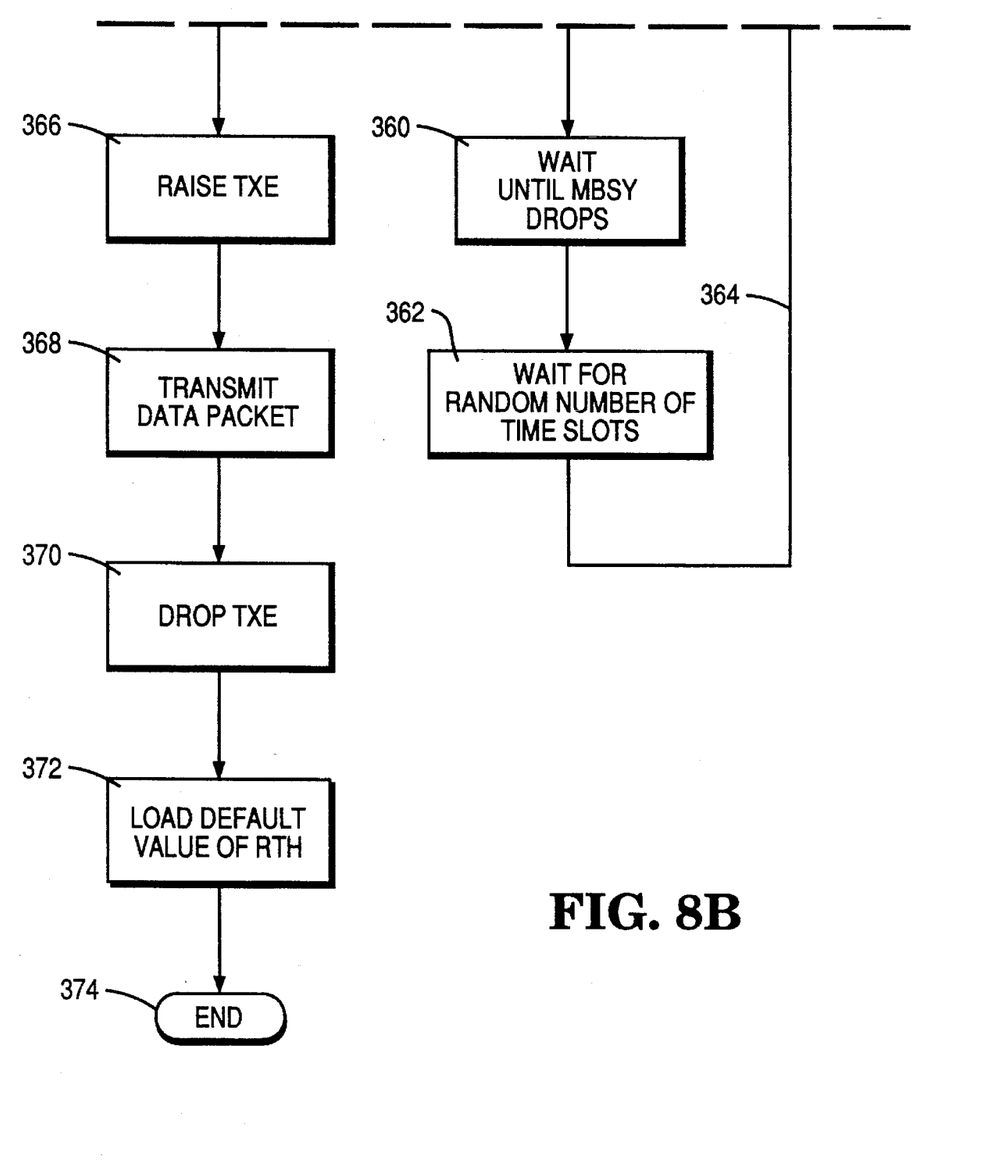

Referring now to FIG. 8, there is shown a flowchart representing a state machine for the operation of a station 12 for transmission of an information packet. From idle state 350, the flowchart proceeds to box 352, where is it determined whether there is a packet ready for transmission. If so, the flowchart proceeds to box 354 where the receive (defer) threshold level (RTH) and transmit power level (TPL) are applied to the modem section 150 (FIG. 6C). After waiting for a short predetermined time (box 356), the flowchart proceeds to box 358, where it is determined whether the MBSY signal (on line 196, FIG. 6C) is active. If so, the flowchart proceeds to a box 360 which indicates that the system waits until the MBSY signal becomes inactive. Thereafter, as shown in box 362, there is a further waiting period of a random number of timeslots (in accordance with the utilized CSMA/CA protocol), before a return to box 358 over line 364. If the MBSY signal is inactive, the flowchart proceeds to box 366 which indicates that the TXE signal (on line 166, FIG. 6B), is raised, thereby initiating data packet transmission (box 368), including transmission of an appended CRC check portion. The signal TXE is then deactivated (box 370) and the default value of the receive (defer) threshold (RTH) is applied to the modem section 150. The flowchart then ends as shown at box 374.

Figure 9:
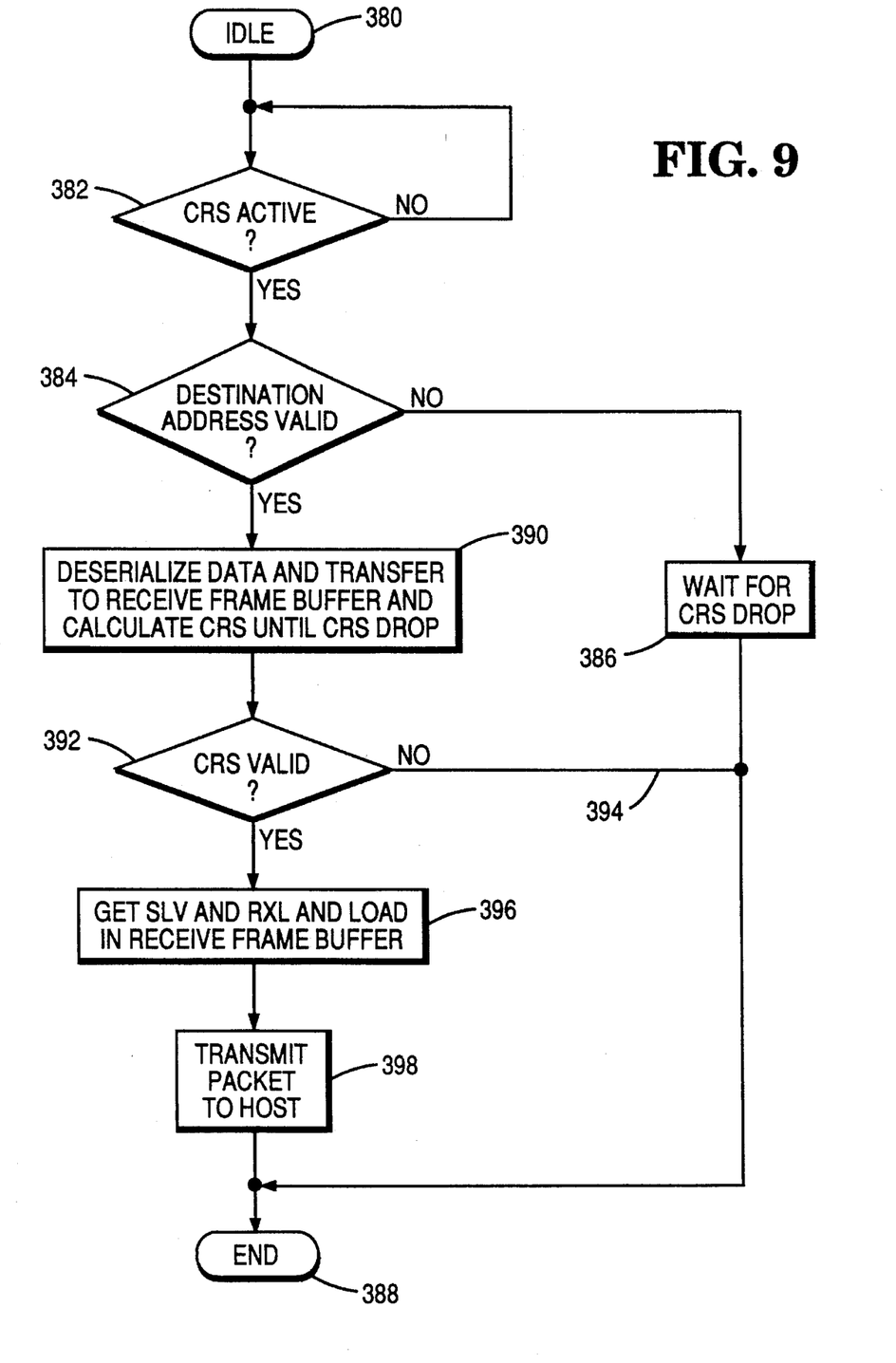
FIG. 9 is a flowchart for information packet reception.

Referring now to FIG. 9, there is shown a flowchart representing a state machine for the operation of a station 12 for reception of an information packet. From the idle state 380, the flowchart proceeds to box 382, where it is determined whether the carrier sense signal (CRS) is active. When this signal becomes active, the flowchart proceeds to box 384 where it is determined whether the packet destination address (DA) is valid for the receiving station. If not, the flowchart proceeds to box 386, and when the CRS signal becomes inactive, the flowchart proceeds to the end state 388. If the DA address is valid, the received data is deserialized and transferred to the receive frame buffer 220 (FIG. 6A) and the CRC is calculated as shown in box 390. The flowchart proceeds to box 392, which indicates that a test is made on the CRC check portion. If this is invalid, the flowchart proceeds to the end state 388 over line 394. If the CRC check is valid, the flowchart proceeds to box 396, where the measured silence (SLV) and packet receive level (RXL) are loaded behind the packet in the receive frame buffer 220 (FIG. 6A). The flowchart then proceeds to box 398, where the received packet is transmitted to the host system, whereafter the flowchart proceeds to the end state 388.

Thus there has been described a wireless LAN system which uses dynamic power control, such that only the power level needed for reliable transmission to a particular station is used for transmissions to that station. The system acquires this capability automatically during regular use of the system for transmission of messages. A further feature is that the defer threshold of a station desiring to transmit is automatically adjusted in accordance with the particular station to which the transmission is directed. Also, the receive signal level at the intended receiver is automatically adjusted to be strong enough such that sufficient margin is available over the general background interference level in the region of the receiving station.

The system has the advantage that medium reuse is significantly improved, especially for small clustered networks. The overall system throughput is therefore substantially increased.

What is claimed is:

1. A method of operating a wireless local area network including a plurality of stations (12) utilizing a common wireless communication channel, said stations communicating through the transmission of information packets (80) having an adjustable transmit power level, said stations employing a CSMA/CA (carrier sense multiple access with collision avoidance) protocol wherein a station desiring access to the transmission medium will first sense the medium to determine whether there is a carrier signal present higher than a predetermined defer threshold value and will defer its transmission until the medium is sensed to be available, said method comprising the steps of:

providing, in each transmitted information packet (80) a transmit power level value (92) representing the power level at which the packet (80) is transmitted;

measuring a receive power level at which a transmitted information packet (80) is received;

dynamically adjusting the power level of information packets (80) transmitted between any two stations (12), in dependence on the difference between said transmit power level and said receive power level for said two stations; and dynamically adjusting the defer threshold value for transmissions between said any two stations (12), in dependence on the difference between said transmit power level and said receive power level for said two stations.

2. A method of operating a wireless local area network including a plurality of stations (12) utilizing a common wireless communication channel, said stations communicating through the transmission of information packets (80) having an adjustable transmit power level, said stations employing a CSMA/CA (carrier sense multiple access with collision avoidance) protocol wherein a station desiring access to the transmission medium will first sense the medium to determine whether there is a carrier signal present higher than a predetermined defer threshold value and will defer its transmission until the medium is sensed to be available, said method comprising the step of:

providing, in each transmitted information packet (80) a transmit power value portion (92) representing the power level at which the packet (80) is transmitted;

dynamically adjusting the power level of information packets (80) transmitted over a signal path between any two stations (12), in dependence on the signal path between said stations (12); and dynamically adjusting the defer threshold value for transmissions between said any two stations 12, in dependence on the signal path between said stations (12); and said step of dynamically adjusting the power level of information packets transmitted between any two stations including the steps of:

measuring a receive power level at which a transmitted information packet (80) is received; and subtracting said receive power level from the transmit power level contained in said packet to provide an attenuation value for the signal path between said two stations (12).

3. The method according to claim 2, wherein said step of dynamically adjusting the power level of information packets transmitted between any two stations includes the step of:

averaging the attenuation values in respect of a plurality of received information packets (80) from the same source station (12).

4. The method according to claim 3, wherein said step of dynamically adjusting the power level of information packets transmitted between any two stations includes the steps of:

measuring a background interference level at each of said stations (12);

maintaining a record of measurements of said background interference level; and providing, in each information packet (80) transmitted by that station (12), a silence level portion (90) representing the background interference level at the transmitting station (12).

5. The method according to claim 4, wherein said step of dynamically adjusting the power level of information packets transmitted between any two stations includes the steps of:

averaging measurements of the background interference level at each station (12).

6. The method according to claim 5, wherein said step of dynamically adjusting the power level of information packets transmitted between any two stations includes the steps of:

utilizing the attenuation values at a destination station (12) and the received source station silence level values to determine a transmit power level value for the signal path between said source and destination stations (12); and storing the determined transmit power level value.

* * * * *